United States Patent
Vogt

(10) Patent No.: US 6,626,377 B1
(45) Date of Patent: Sep. 30, 2003

(54) WINDOW/LENS CLEANING DEVICE

(75) Inventor: Gerhard Vogt, Bebra (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/724,550

(22) Filed: Nov. 28, 2000

(30) Foreign Application Priority Data

Dec. 2, 1999 (DE) .......................... 199 58 196

(51) Int. Cl.⁷ ................ B05B 1/10; B60S 1/46
(52) U.S. Cl. ............... 239/284.1; 239/288; 239/288.3; 239/104; 239/587.1; 239/587.5; 239/587.6; 239/589.1
(58) Field of Search ............ 239/284.1, 284.2, 239/288, 288.3, 288.5, 104, 587.1, 587.5, 587.6, 589.1

(56) References Cited

U.S. PATENT DOCUMENTS

| | | | | |
|---|---|---|---|---|
| 2,289,650 A | * | 7/1942 | Horton | 239/284.1 |
| 3,199,787 A | * | 8/1965 | Oishei et al. | 239/284.1 |
| 4,029,259 A | * | 6/1977 | Ursel et al. | 239/284.2 |
| 5,163,619 A | | 11/1992 | Wada | |
| 6,050,503 A | * | 4/2000 | Sühring et al. | 239/284.1 |
| 6,082,636 A | * | 7/2000 | Yoshida et al. | 239/284.1 |
| 6,220,524 B1 | * | 4/2001 | Tores et al. | 239/284.1 X |
| 6,247,652 B1 | * | 6/2001 | Stange et al. | 239/284.1 |
| 6,296,198 B1 | * | 10/2001 | Tores | 239/284.1 |

FOREIGN PATENT DOCUMENTS

| | | |
|---|---|---|
| DE | 2221522 | 11/1973 |
| DE | 2503256 | 7/1976 |
| DE | 3047396 | 6/1982 |
| DE | 8806369 | 6/1989 |
| DE | 4422590 | 1/1996 |
| DE | 19652083 | 6/1998 |
| DE | 19742471 | 4/1999 |
| DE | 19746059 | 4/1999 |
| DE | 19748447 | 5/1999 |
| DE | 19802491 | 7/1999 |
| GB | 447043 | 5/1936 |
| GB | 924557 | 4/1963 |

* cited by examiner

Primary Examiner—Robin O. Evans
(74) Attorney, Agent, or Firm—Martin A. Farber

(57) ABSTRACT

A window/lens cleaning device (1), in particular for a motor vehicle, having a nozzle appliance (2) for spraying cleaning fluid, the nozzle appliance being mounted in an adjustable manner on a holding part (3). The holding part is formed as a nozzle cap (3) which surrounds the nozzle appliance (2) multilaterally and within which the nozzle appliance (2) can be adjusted.

8 Claims, 1 Drawing Sheet

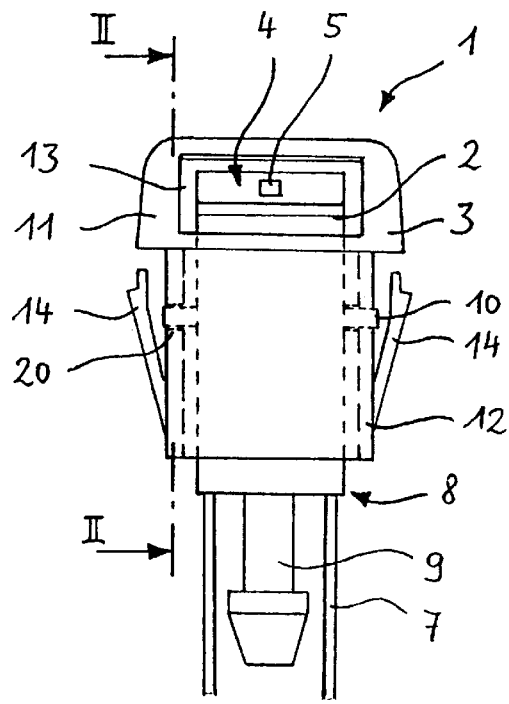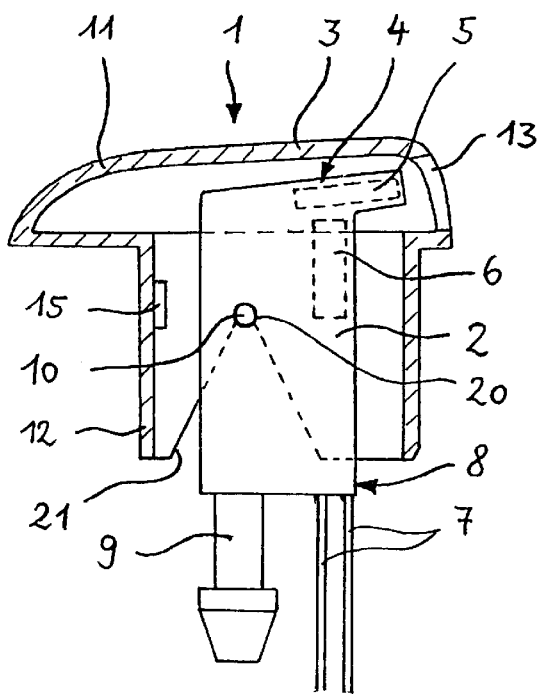
Fig. 1  Fig. 2
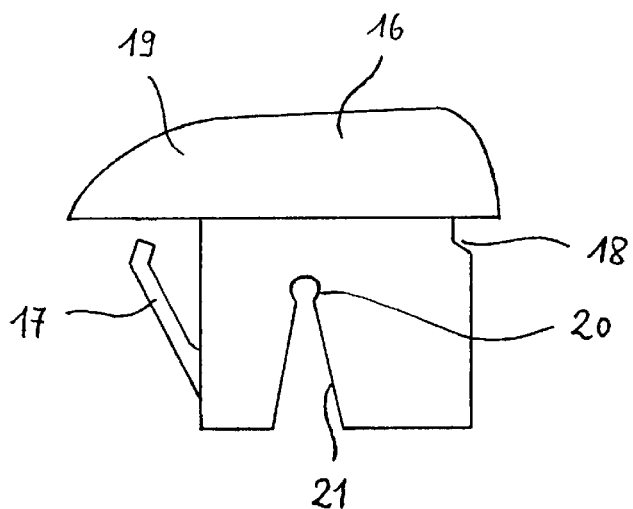
Fig. 3

WINDOW/LENS CLEANING DEVICE

FIELD AND BACKGROUND OF THE INVENTION

The invention relates to a window/lens cleaning device, in particular for a motor vehicle, having a nozzle appliance for spraying cleaning fluid, the nozzle appliance being mounted in an adjustable manner on a holding part.

Published specification DE 197 42 471 A1 has disclosed a window/lens cleaning device of the generic type which has a nozzle appliance in the form of a fluidic nozzle for spraying cleaning fluid onto the window/lens of a motor vehicle. The nozzle appliance is mounted via a ball-and-socket joint on a holding part which at the same time forms a connecting branch for the cleaning fluid. The holding part can be fastened to a body part of the motor vehicle in an invariable manner, while the nozzle appliance can be rotated relative to the holding part and can be orientated with respect to the window/lens in order to compensate for tolerances.

The published specification DE 196 52 083 A1 has disclosed a window/lens cleaning device having a nozzle stem and a washer nozzle, in particular a fluidic nozzle, the window/lens cleaning device being designed as a rigid component which cannot be adjusted per se, and being mounted in a pivotable manner on the body of a motor vehicle at a first bearing point. At a second bearing point, the window/lens cleaning device is arranged on the body in an adjustable manner via an eccentric screw and a clamping-spring arrangement. An adjustment of the eccentric screw enables the entire window/lens cleaning device to be slightly pivoted about the first bearing point in order to compensate for manufacturing tolerances on the vehicle body, and so the angle of inclination with respect to the window/lens can therefore be set.

Furthermore, published specification DE 198 02 491 A1 has disclosed a window/lens cleaning device having a nozzle head and a base, the window/lens cleaning device being designed as a non-adjustable unit. The base can be inserted in an exactly fitting manner into a cutout in a body part of a motor vehicle and has, on a side surface, a clipping arrangement which, in the installed state, acts on the body part and ensures that the window/lens cleaning device is fixed in position on the body part. In the installed state, the nozzle head sits in an unadjustable manner on the body part and has a shaping which is coordinated with aerodynamic conditions. Two different nozzle appliances for spraying washer fluid are provided in the nozzle head.

Other known window/lens cleaning devices which produce a concentrated, directed fluid jet have a nozzle head which is mounted rotatably on the body of a motor vehicle, is designed such that it is sufficiently stable and the shaping of which is matched aerodynamically to a certain rotational position. This requires a complicated mounting, dimensioned in accordance with the possible loads and rotational movements, on a body part. Adjustment of the nozzle head results in the latter leaving the aerodynamically optimised position giving rise to undesirable flow conditions.

SUMMARY OF THE INVENTION

The invention is based on the object of providing a window/lens cleaning device of the type mentioned at the beginning, which can be produced in a particularly simple manner and can be optimised aerodynamically and whose adjustable nozzle appliance is arranged in a particularly well-protected manner.

According to the invention there is provided a device having an arrangement wherein a nozzle appliance is surrounded by a nozzle cap within which the nozzle appliance can be adjusted within a wide range. The nozzle cap can be fixed to a body part or to another motor-vehicle component which is fixed to the body. Since said nozzle cap is immovable, it can be optimised aerodynamically and coordinated precisely with the flow conditions over the vehicle body irrespective of the possible positions of the nozzle appliance. The nozzle cap can be produced from an advantageous material, which is optionally different from the material of the nozzle appliance, in particular from an impact-proof and heat-resistant plastic or from a light metal. The nozzle cap preferably surrounds the nozzle appliance on virtually all sides. The adjustability of the nozzle appliance within the nozzle cap enables the window/lens cleaning device according to the invention to be fitted in various types of vehicle without structural changes and permits the nozzle appliance to be set flexibly with respect to the window/lens to be cleaned. Furthermore, adjustment of the nozzle appliance enables manufacturing and installation tolerances to be compensated for in a simple manner without a substantial change to the outer contour of the window/lens cleaning device. There is the option of mounting a plurality of different nozzle appliances in an independently adjustable manner under a common nozzle cap.

In a development of the invention, the window/lens cleaning device includes, as the holding part, a nozzle cap which completely covers the nozzle appliance and on at least one side is equipped with at least one passage opening for the cleaning fluid sprayed by the nozzle appliance. A nozzle cap of this type can be shaped not only to enable optimum flow around it, but also reliably protects the nozzle appliance situated beneath it from dirt, moisture, ice, wind, impact loads and heat losses. Particularly when nozzle appliances which can be heated are used, a nozzle cap according to the invention enables the consumption of heat energy in the nozzle appliance to be reduced, since the nozzle cap prevents the nozzle appliance from cooling. For this purpose, heat insulation may be provided in the nozzle cap. Furthermore, a nozzle cap of this type can be shaped to have a particularly pleasing appearance.

In a further development of the invention, the nozzle cap has a covering section which is surface finished, coated and/or painted. A surface finish, coating or painting of the nozzle cap can be undertaken in particular for the purpose of protecting against corrosion, for improving the resistance to weathering or for the pleasing appearance. Moreover, a surface coating can have properties which are particularly favourable in terms of flow and which deflect dirt. The nozzle cap is preferably chrome-plated and/or at least part of it is painted in the colour of the adjacent body parts.

In a further development of the invention, the nozzle cap has a holding section which can be inserted into a cutout in a body part of a motor vehicle and can be fastened to this body part. The holding section is preferably designed integrally with a covering section or is connected fixedly to the latter forming the nozzle cap together with the latter. The holding section serves on the one hand to fix the nozzle cap to the body of the motor vehicle and on the other hand for the movable mounting of the nozzle appliance.

In a further development of the invention, the holding section has bearing elements for the moveable mounting of the nozzle appliance. Sliding bearings for holding shafts connected to the nozzle appliance are preferably suitable as the bearing elements. In particular, a holding section produced from plastic makes it possible in a simple manner to provide elastically deformable recesses having favourable frictional properties to latch spindles or shafts in. Alternatively, a ball-and-socket joint or similar means for mounting the nozzle appliance in the nozzle cap can also be provided.

In a further development of the invention, the holding section has at least one clipping and/or latching element with which the nozzle cap can be fastened to the body part. The clipping or latching element preferably protrudes laterally from the holding section and can be deformed elastically during installation in such a manner that first of all it does not substantially obstruct the introduction of the holding section into the cutout of the body part and subsequently grips the cutout from behind in such a manner that the nozzle cap is fastened in a form-fitting manner in the cutout. In this arrangement, the clipping or latching element preferably interacts with the covering section of the nozzle cap in such a manner that the body part is grasped by them as they interact. The clipping or latching element can also be designed in such a manner that in the installed state it acts in a force-fitting manner on the body part or engages in a form-fitting manner into a cutout on the body part.

In a further development of the invention, the nozzle appliance has a fluidic nozzle with fan-shaped spraying characteristics. The fluidic nozzle enables a large region of the window/lens to be cleaned to be wetted with cleaning fluid. As a result, the nozzle appliance then only needs to be adjustable essentially perpendicularly with respect to the fan plane of the spray jet produced in order to ensure, by setting the nozzle appliance, optimum wetting of the window/lens.

In a further development of the invention, the nozzle appliance is mounted in a manner such that it can be pivoted about a bearing spindle which is orientated at least approximately parallel to the plane of the spray jet of the fluidic nozzle and/or to the surface of the window/lens to be sprayed. This results in a nozzle cap which can be produced and fitted in a particularly simple manner. The nozzle appliance can preferably be inclined perpendicularly with respect to the plane of the spray jet of the fluidic nozzle and perpendicularly with respect to the window/lens to be sprayed. Furthermore, in spite of the simple construction, great flexibility and a high number of setting options of the nozzle appliance are ensured.

BRIEF DESCRIPTION OF THE DRAWINGS

Apart from the claims, these and further features of the invention also emerge from the description and the drawing. The individual features can each be realised on their own or a number of them can be realised in the form of subcombinations in an embodiment of the invention. Preferred exemplary embodiments of the invention are illustrated in the figures of the drawing and are explained in greater detail below.

In the drawing:

FIG. 1 shows a schematic rear side view of a window/lens cleaning device according to the invention;

FIG. 2 shows a sectional view of the window/lens cleaning device according to FIG. 1 along the line II—II; and FIG. 3 shows a nozzle cap of a second exemplary embodiment of the window/lens cleaning device according to the invention.

DETAILED DESCRIPTION OF THE PREFERRED EMBODIMENT

FIGS. 1 and 2 illustrate a first exemplary embodiment of a window/lens cleaning device 1 for cleaning a windshield or a headlamp lens of a motor vehicle. The window/lens cleaning device is arranged in front of the windshield or headlamp, as seen in the direction of travel of the motor vehicle, and on its rear side sprays cleaning fluid against the window/lens to be cleaned. Of course, a window/lens cleaning device of this type can also be used in other means of transport and for other windows/lenses and also in a different orientation.

The window/lens cleaning device 1 comprises a nozzle appliance 2 which is mounted pivotably in a nozzle cap 3, the nozzle cap 3 completely covering the nozzle appliance 2. In a modified exemplary embodiment, a plurality of nozzle appliances may also be arranged in one nozzle cap.

The nozzle appliance 2 comprises a nozzle head 4 together with a nozzle element 5, a supply duct (not illustrated) for cleaning fluid and a heating appliance 6. A so-called fluidic nozzle which is already known per se is provided as the nozzle element 5, which nozzle can produce a fluid jet which oscillates in a plane in such a manner that a well fanned-out spray jet arises. Compared to conventional spherical nozzles which produce a directed spray jet emerging in a concentrated manner, a substantially larger region of the window/lens to be cleaned can be wetted with cleaning fluid by means of the fluidic nozzle. In a modified exemplary embodiment, a plurality of identical or a plurality of different nozzle elements can be provided in the nozzle head 4, it also being possible to supply different washer fluids to said elements via different feed ducts. An electric resistance heating means having electrical connections 7 is, for example, provided as the heating appliance 6. Freezing of the cleaning fluid in the nozzle appliance 2 during frost can be prevented or eliminated by the heating appliance 6. Alternatively, any other heating appliances can be provided in the nozzle head 4.

The nozzle appliance 2 furthermore comprises a base 8 having a connecting branch 9 and bearing elements 10 in the form of two laterally protruding shafts. The connecting branch 9 is provided for the connection of a tube (not illustrated) via which cleaning fluid can be fed to the nozzle appliance 2. The shafts 10 engage in two corresponding holes 20 on the nozzle cap 3 and are mounted rotatably therein. A separate heating appliance can be provided in the base 8 of the nozzle appliance 2; this heating appliance can optionally replace the heating appliance 6 in the nozzle head 4.

The nozzle cap 3 comprises a covering section 11 which upwardly closes the nozzle cap 3. On the rear side of the covering section, as seen in the direction of travel of the motor vehicle, a window-like passage opening 13 for the cleaning fluid sprayed by the nozzle appliance 2 is provided in the covering section 11. The covering section 11 is coordinated with the flow conditions of the relative wind at that location on the motor vehicle body at which the window/lens cleaning device 1 is to be arranged, and correspondingly shaped favourably in terms of flow. Since the nozzle cap 3 is installed fixedly in the motor-vehicle body, the shape of the covering section 11 can be optimised precisely with this single installation position.

The nozzle cap 3 is formed by the covering section 11 together with a holding section 12, covering section 11 and holding section 12 preferably being designed integrally. The nozzle cap 3 is produced, for example, from a plastic which is impact-proof and heat-resistant, but which is also sufficiently elastic, the covering section 11 preferably being painted in the colour of the adjacent motor-vehicle body. In this case, the paint is intended at the same time to be dirt-deflecting and resistant to weathering. Alternatively, the covering section 11 may also be chrome-plated, nickel-plated or surface coated with other materials. In one modified exemplary embodiment, the nozzle cap 3 is produced from a light metal and preferably entirely covered by a corrosion-resistant protective layer.

The covering section 11 has a greater width and a longer length than the holding section 12, so that the holding section 12 can be inserted into a cutout in a body part in such a manner that the covering section 11 sits on the body part, i.e. the nozzle cap 3 is unable to slip through the cutout. As can be seen from FIG. 1, clipping elements 14 are arranged at the sides of the holding section 12, said clipping elements being deformed elastically as the holding section 12 is being inserted into the cutout of the body part. Said clipping elements grip the body part from behind and exert a clamping force as soon as the desired installation position of the nozzle cap 3 has been reached. Moreover, a recess 15 in the form of a small depression is provided on the holding section 12, in which recess a fastening or setting means, which is held on the body part, can engage in a form-fitting manner. In one modified exemplary embodiment, instead of the clipping elements 14 latching elements are provided which do not exert any clamping force in the installation position, but are assigned corresponding recesses on the body part in which they engage in a form-fitting manner.

Holes 20, in which the shafts 10 of the nozzle appliance 2 are mounted rotatably, are, as already mentioned, arranged in the side walls of the holding section 12. The holes 20 are provided with funnel-like introducing slots 21 into which the shafts 10 can be introduced in a self-centering manner. Because of the 2elastic design of the holding section 12 and/or of the shafts 10, the openings between the introducing slots 21 and the holes 20 can be made slightly smaller than the diameter of the shafts 10, with the result that the shafts 10 can be latched into the holes 20 by elastic deformation of the holding section 12 and/or of the shafts themselves. The holes 20 themselves are furthermore designed in such a manner that the shafts 10 are fastened frictionally therein, since the nozzle appliance 2 is not to be pivotable independently, but only because of an external adjusting force by overcoming frictional forces. Transition or pressing fits between the shafts and holes are preferably selected. In one modified exemplary embodiment, provision is made to provide at least one shaft 10 with a fixing screw connection. In a further modified exemplary embodiment, provision is made to provide the nozzle cap with an additional adjusting drive for the nozzle appliance, with which drive the nozzle appliance can be adjusted automatically.

FIG. 3 illustrates a nozzle cap 16 which is slightly modified as compared with the nozzle cap 3 and belongs to a second exemplary embodiment of the window/lens cleaning device according to the invention. Like the nozzle cap 3, the nozzle cap 16 has holes 20 having adjacent introducing slots 21. Like the nozzle cap 3, the nozzle cap 16 can be inserted in a precisely fitting manner into a cutout of a body part of a motor vehicle. However, in the case of the nozzle cap 16, instead of the lateral clipping elements 14, a clipping element 17 is arranged on the rear side of the nozzle cap 16. Furthermore, a channel-shaped recess 18 is provided on the front side of the nozzle cap 16, said recess engaging in the installation position around the edge of the cutout of the body part. In the installation position, the clipping element 17 grips the body part from behind, with the result that the clipping element 17 wedges the body part between itself and the covering section 19 of the nozzle cap. In addition, recesses can be provided in the holding section of the nozzle cap 16, in which recesses fastening means on the vehicle body engage in a form- and/or force-fitting manner.

The window/lens cleaning device according to the invention is distinguished in that the nozzle cap which is provided can be produced in a simple manner and can be inserted in a fixed manner into a body part of the motor vehicle, the nozzle appliance which is mounted adjustably in said cap likewise being able to be produced in a simple manner. The nozzle cap, which is fixed on the vehicle, can be optimised aerodynamically without having to take the adjustment of the nozzle appliance into consideration. The nozzle cap provides the nozzle appliance with optimum protection against dirt, moisture, ice, wind, impact loads and heat losses, and at the same time can be shaped to have a pleasing appearance and can be coordinated with the surrounding vehicle parts. The window/lens cleaning device according to the invention can be installed in different types of vehicle without substantial structural changes. In particular, the nozzle appliance does not have to be changed, since it operates within an appropriately designed nozzle cap irrespective of the installation conditions of the nozzle cap. The use, especially, of a fluidic nozzle as the nozzle element in the nozzle appliance makes additional simplification possible, since because of the fanned spray jet of the fluidic nozzle, the nozzle appliance merely needs to be adjustable perpendicularly with respect to the plane of the spraying fan produced, which very much simplifies the mounting of the nozzle appliance within the nozzle cap. Furthermore, better wetting of the window/lens to be cleaned with cleaning fluid can be achieved using the fluidic nozzle.

What is claimed is:

1. A window/lens cleaning device having a nozzle appliance for spraying cleaning fluid, the nozzle appliance being mounted in an adjustable manner on a holding part, wherein the holding part is formed as a nozzle cap (3) which surrounds the nozzle appliance (2) multi-laterally and within which the nozzle appliance (2) is adjustable and wherein the nozzle appliance is rotably mounted and fastened by the friction force in the nozzle cap (3) with a shaft (10) and a hole (20) arrangement.

2. The window/lens cleaning device as claimed in claim 1, wherein the holding part is formed as a nozzle cap (3) which completely covers the nozzle appliance (2) and on at least one side has at least one passage opening (13) for cleaning fluid sprayed by the nozzle appliance (2).

3. The window/lens cleaning device as claimed in claim 1, wherein the nozzle cap has a covering section (11) which is at least one of surface-finished, coated and painted.

4. The window/lens cleaning device as claimed in claim 1, wherein the nozzle cap (3) has a holding section (12) which is insertable into a cutout in a body part of a motor vehicle and is fastenable to the body part.

5. The window/lens cleaning device as claimed in claim 4, wherein said holding section (12) has bearing elements (20) for a moveable mounting of the nozzle appliance (2).

6. The window/lens cleaning device as claimed in claim 5, wherein the holding section (12) has at least one of a clipping and latching element (14,17) with which the nozzle cap (3) is fastenable to the body part.

7. The window/lens cleaning device claimed in claim 1, wherein the nozzle appliance (2) has a nozzle element (5), said nozzle element being a fluidic nozzle having fan-shaped spraying characteristics.

8. The window/lens cleaning device as claimed in claim 7, wherein the nozzle appliance (2) is pivotably mounted about a bearing shaft (10) which is orientated at least approximately parallel to a plane of a spray jet of the fluidic nozzle (5) and/or to the surface of the window/lens to be sprayed.

* * * * *